United States Patent [19]
Sanford et al.

[11] Patent Number: 5,270,118
[45] Date of Patent: Dec. 14, 1993

[54] COMPOSITES HAVING IMPROVED SURFACE PROPERTIES

[75] Inventors: William M. Sanford, Mendenhall, Pa.; William C. Uy, Newark, Del.

[73] Assignee: E. I. du Pont de Nemours and Company, Wilmington, Del.

[21] Appl. No.: 961,322

[22] Filed: Oct. 15, 1992

Related U.S. Application Data

[62] Division of Ser. No. 619,149, Nov. 28, 1990, Pat. No. 5,178,812.

[51] Int. Cl.$^5$ .................. B32B 27/00; B32B 27/34
[52] U.S. Cl. ........................ 428/473.5; 428/474.4
[58] Field of Search ................ 428/473.5, 474.4; 264/344, 211.19, 171

[56] References Cited

U.S. PATENT DOCUMENTS 4,963,304 10/1990 Im et al. ..................... 264/344
5,000,898 3/1991 Gabriel et al. ................ 264/171
5,011,643 4/1991 Yang ........................ 264/211.19

Primary Examiner—Thomas J. Herbert, Jr.

[57] ABSTRACT

Polymeric composite materials having a decreasing concentration gradient of polymer matrix from the material's surface to the material's interior and a process for making such materials, whereby polymer matrix is extracted from the interior of the material in such a manner that the matrix concentration at the material's surface increases.

26 Claims, 4 Drawing Sheets

COMPOSITES HAVING IMPROVED SURFACE PROPERTIES

The Government has rights in this invention pursuant to contract No. F 33615-86-C-5069 awarded by the Department of the Air Force, Department of Defense.

This is a division of application Ser. No. 07/619,149, filed Nov. 28, 1990 and issued as U.S. Pat. No. 5,178,812.

BACKGROUND OF THE INVENTION

1. Field of the Invention

The present invention relates to polymeric composite materials having improved surface properties More particularly, the invention relates to a polymeric composite material having a decreasing concentration gradient of polymer matrix from the material's surface to the material's interior. The invention also includes a process for extracting polymer matrix from the interior of a composite material in order to increase the matrix concentration at the material's surface.

2. Description of the Prior Art

It is known that high modulus fibers, such as poly(p-phenylene terephthalamide) aramid fibers, may be incorporated into polymer matrix materials to form composites. For example, United Kingdom Patent Application, 2,195,672 A, published Apr. 13, 1988 discloses a process for fabricating composites comprising forming a network of microfibrils of a rigid polymer, a polymer which has the ability to form a liquid crystalline phase either in a solution or melt, and interpenetrating the microfibrils with a matrix material, such as a thermoplastic polymer, to form a composite.

Gabriel et al., coassigned, U.S. Pat. No. 5,000,898, the disclosure of which is hereby incorporated by reference, discloses a process for making oriented, fibers of lyotropic polysaccharide/thermally-consolidatable polymer blends by spinning a biphasic solution containing at least about 55% and less than about 80% by weight of a lyotropic polysaccharide polymer, and at least about 20% and less than about 45% by weight of a thermally-consolidatable polymer. These fibers are particularly useful for composite applications.

Yang, coassigned, U.S. Pat. No. 5,011,643, the disclosure of which is hereby incorporated by reference, discloses a process for making oriented, fibers of para-aramid/thermally-consolidatable polymer blends by spinning a biphasic solution containing at least about 55% and less than about 80% by weight of a para-aramid polymer, and at least about 20% and less than about 45% by weight of a thermally-consolidatable polymer. These fibers are particularly useful for composite applications.

By, U.S. Pat. No. 4,810,735, the disclosure of which is hereby incorporated by reference, discloses fibers prepared from spinnable dopes comprising a first polymer selected from poly(paraphenylene benzobisthiazole) (PBT); poly(paraphenylene benzobisoxazole) (PBO); or poly-2,5-benzoxazole (AB-PBO) polymers, and a second polymer selected from a thermoplastic polymer or intractable polymer in a combined solvent of poly(phosphoric acid) and methanesulfonic acid or chlorosulfonic acid. These fibers are particularly useful for composite applications.

However, it was found that composite fibers, particularly those disclosed in the foregoing Gabriel et al., Yang, and Uy references, often have a deficient concentration of polymer matrix on their surfaces which causes poor adhesiveness, particularly in a cross-ply composite construction It is often desirable to have a high concentration of polymer matrix at the surface of a polymeric composite material in order to improve adhesiveness, and other properties such as the surface finish. An objective of the present invention is to provide such materials having a decreasing concentration of polymer matrix from the material's surface to the material's interior.

Another objective of the invention is to provide a process for extracting polymer matrix from the interior of a polymeric composite material in order to increase the matrix concentration at the material's surface.

SUMMARY OF THE INVENTION

The present invention relates to a process for extracting polymer matrix from the interior of polymeric composite materials such as oriented, shaped articles and plies. Preferably, the polymeric composite material comprises at least about 30% and less than about 80% by weight of a reinforcing polymer phase consisting essentially of at least one lyotropic polymer, and at least about 20% and less than about 70% by weight of a polymer matrix consisting essentially of at least one thermally-consolidatable polymer The reinforcing polymer phase may be continuous in the direction of orientation of the material, while interpenetrating the polymer matrix throughout the material, and the reinforcing polymer phase and polymer matrix may be co-continuous. Suitable lyotropic polymers include para-aramid and aromatic heterocyclic polymers Suitable thermally-consolidatable polymers include polyimides and thermoplastic polymers, particularly thermoplastic polyamides The process comprises treating the material with a selective solvent which dissolves the polymer matrix, while not substantially dissolving the reinforcing polymer phase. Suitable solvents for lyotropic/thermally-consolidatable blends include, for example, sulfuric acid, methanesulfonic acid, formic acid, and hexafluoroisopropanol. The solvent is then removed, whereby at least some of the polymer matrix is extracted from the interior of the material and the matrix concentration increases at the material's surface. The process of this invention may also be used to treat other polymer blends comprising a polymer matrix and reinforcing phase.

The invention also includes composite materials, which may be made from the foregoing process, having a decreasing concentration gradient of polymer matrix from the material's surface to the material's interior

DETAILED DESCRIPTION OF THE INVENTION

Figure 1:
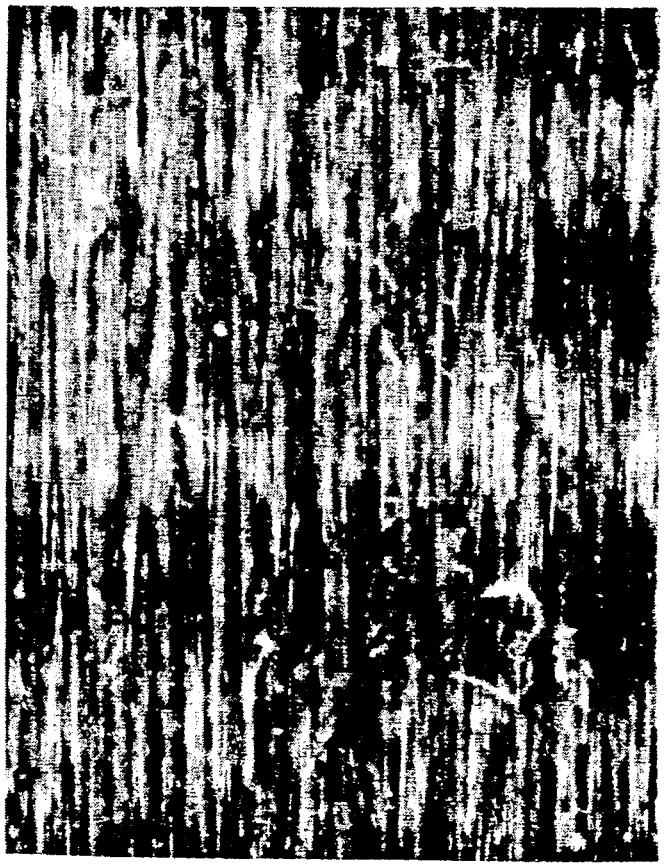
FIG. 1 is a optical micrograph (OM) at 50 ×of a longitudinal section of a poly(paraphenylene benzobisthiazole)(PBT)/poly(ether ketoneketone) (PEKK) microcomposite ply which has not been treated with an acidic solvent.

The present invention relates to polymeric composite materials having a decreasing concentration gradient of polymer matrix from the material's surface to the material's interior, and to a process for extracting at least some of the polymer matrix from the interior of a composite material in such a manner as to increase the matrix concentration at the material's surface.

The polymeric, composite material comprises a polymer matrix and reinforcing phase. Preferably, the composite material comprises a blend of at least one lyotropic polymer, and at least one thermally-consolidatable polymer. By the term, lyotropic polymer, it is meant a class of polymers which have a high persistence length and function as a "rigid rod" in solution. Suitable lyotropic polymers include, for example, aromatic polyamides and aromatic-heterocyclic polymers with chain extending bonds from aromatic/heterocyclic groups which are either coaxial or are parallel and oppositely directed, and polysaccharides with (1,4)-β-linkages in the backbone such as cellulose, cellulose derivatives, chitin, and chitin derivatives.

Preferably, the lyotropic polymers are para-oriented, aromatic polyamides (para-aramids). The term, para-aramid, is meant to refer to para-oriented, wholly aromatic polyamide polymers and copolymers consisting essentially of recurring units of formulas I and II below:

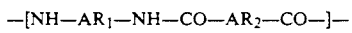

—[NH—AR$_1$—NH—CO—AR$_2$—CO—]—   I

—[NH—AR$_1$—CO]—   II, wherein AR$_1$ and AR$_2$, which may be the same or different, represent divalent, para-oriented aromatic groups. By para-oriented, it is meant that the chain extending bonds from the aromatic groups are either coaxial or are parallel and oppositely directed. Examples include substituted or unsubstituted aromatic groups such as 1,4-phenylene, 4,4'-biphenylene, 2,6-naphthylene, 1,5-naphthalene, and 4,4'—Ph—X—Ph— or 3,4'—ph—X—Ph—, where Ph is a phenylene ring, and X is O, CO, S, SO$_2$, NH, NH—CO or (CH$_2$)$_n$ with n=1–4. Suitable substitutents on the aromatic groups should be nonreactive and include, for example, chloro, lower alkyl and methoxy groups. The term, para-aramid, is also meant to encompass para-aramid copolymers of two or more para-oriented comonomers, including minor amounts of comonomers where the acid and amine functions coexist on the same aromatic species, for example, copolymers produced from such reactants as 4-aminobenzoyl chloridehydrochloride, and 6-amino-2-naphthoyl chloride hydrochloride. In addition, the term, para-aramid, is meant to encompass copolymers containing minor amounts of comonomers containing aromatic groups which are not para-oriented, such as m-phenylene and 3,4'-biphenylene.

The inherent viscosity of the para-aramid in the preferred composite articles should be greater than about 3 dl/g. The most preferred lyotropic polymer is poly(-paraphenylene terephthalamide), PPD-T, having an inherent viscosity of greater than about 4 dL/g.

Suitable aromatic-heterocyclic polymers include, for example, poly(paraphenylene benzobisthiazole) (PBT), poly(paraphenylene benzobisoxazole) (PBO), and poly(paraphenylene benzobisimidazole) (PBIAB). PBO and PBT are particularly useful and preferably have an intrinsic viscosity of at least 15 dL/g.

Suitable polysaccharides with (1,4)-β-linkages in the backbone include, for example, cellulose, cellulose derivatives, chitin and chitin derivatives. These chain-extending (1,4)-β-linkages contribute to the polymer exhibiting rigid rod-like behavior in solution.

By the term, thermally-consolidatable polymer, it is meant a class of polymers which can be consolidated by applying heat and pressure according to such mechanisms as melting, softening, and chemical reactions. Preferably, thermoplastic polymers are used. These thermoplastic polymers include, for example, poly(ether ketoneketone) (PEKK); polyacrylonitrile(PAN); crystalline thermoplastic polyamides, such as poly(hexamethylene adipamide) and poly (ε-caproamide)); and amorphous thermoplastic polyamides. Polyimides may also be used. Amorphous thermoplastic polyamides are particularly useful for the present invention.

The oriented, shaped composite articles are formed by preparing a solution, or dope, of a polymer which will form a reinforcing polymer phase, e.g., a lyotropic polymer, and a polymer matrix, e.g., a thermoplastic polymer, in a suitable solvent. The solution, or dope, may be prepared by techniques known in the art, but it should be well-mixed in such a manner that it appears homogeneous to the unaided eye. Above a critical concentration of the lyotropic and thermally-consolidatable polymers, the solution segregates into two coexisting phases, wherein one phase is optically anisotropic (liquid crystalline) and the other phase is isotropic. The anisotropic domains primarily include the lyotropic polymer, while the isotropic domains primarily include the thermally-consolidatable polymer. The resulting solids concentration should also be such that the lyotropic polymer does not precipitate out of the solution. Generally, a solution concentration of 12 to 20 percent by weight of polymer is effective.

Preferably, the solvent dissolves enough of the lyotropic and thermally-consolidatable polymers to form a biphasic solution. For para-aramid/thermoplastic polyamide polymer blends, sulfuric acid having a concentration between about 99 and 102 percent by weight is a suitable solvent. For some polymer blends, it is necessary to use a mixed solvent. For example, a combination of poly(phosphoric acid)and methanesulfonic acid or chlorosulfonic acid, as disclosed in U.S. Pat. No. 4,810,735, can be used with PBT/thermoplastic polyamide and PBO/thermoplastic polyamide polymer blends. A mixed solvent of trifluoroacetic acid and formic acid can be used for cellulose triacetate/thermoplastic polyamide polymer blends.

For lyotropic/thermally-consolidatable blends, the reinforcing polymer phase comprises at least about 30 percent and less than about 80 percent by weight of the article and the polymer matrix comprises at least about 20 percent and less than about 70 percent by weight of the article. Generally, it is necessary for the reinforcing polymer phase to contain at least about 55 percent and preferably greater than about 60 percent by weight of the lyotropic polymer based on the combined weight of both polymers in order to obtain spinning continuity and high tensile strength in the articles. Generally, it is necessary for the polymer matrix to contain at least about 20 percent by weight of the thermally-consolidatable polymer based on the combined weight of both polymers in order to facilitate consolidation of the articles.

The reinforcing polymer phase may be substantially continuous in the direction of orientation of the article, while interpenetrating the polymer matrix throughout said article. In a fiber or ply, wherein the direction of orientation is longitudinal, the reinforcing polymer phase, as microfibrils, extends continuously along the length of the fiber. For fibers or plies of the present invention, the orientation angle is preferably less than 30°.

If the lyotropic polymer, PPD-T, is used, the articles preferably have an orientation angle less than 20°, and the reinforcing polymer phase and polymer matrix are substantially continuous in the direction of orientation of the article.

In order for the reinforcing polymer phase containing the lyotropic polymer to be continuous in the direction of orientation of the article, it is necessary for the reinforcing polymer phase and the polymer matrix to be finely-divided in the blend. The polymer matrix is preferably distributed into domains having a width less than about 300 microns, and more preferably less than about 100 microns. While this distribution can be achieved by adding the polymers simultaneously to the solution and mixing with strong agitation over along period of time, it is preferable to first dissolve the less soluble lyotropic polymer in the solvent and then subsequently add the more soluble thermally-consolidatable polymer. Prior to adding the thermoplastic polymer, the temperature of the solution must be sufficiently high to insure that the melted solution does not freeze and transform into a crystalline solvate. However, the temperature should not be so high that the polymers degrade in solution. In order to prevent gross phase separation, it is usually necessary to continue agitating the solution, or to form the oriented, shaped composite articles shortly after the solution is prepared.

The solutions can be used to make oriented, shaped composite articles by such known techniques as forming fibers by spinning, extruding the dope into films, or fabricating the dope into fibrids. However, these techniques must be capable of removing the solvent from the high viscosity solutions which are typically greater than 100 poise. Suitable techniques include, for example, air gap wet spinning and film extrusion processes, wherein the solution passes through a spinneret or die into an air gap and subsequently into a coagulant bath, wherein the solvent is removed from the solution. Generally, processes which produce high tenacity fibers and films from lyotropic polymers may be used in the present invention. The methods disclosed in Blades, U.S. Pat. No. 3,767,756, which is hereby incorporated by reference, may also be used to spin the fibers of the invention.

These oriented, shaped composite articles are then treated with an acidic solvent which selectively dissolves the polymer matrix but does not substantially dissolve the reinforcing polymer phase. If the reinforcing polymer phase comprises a lyotropic polymer and the polymer matrix comprises a thermoplastic polyamide, suitable solvents include, for example, sulfuric acid, methanesulfonic acid, formic acid, and hexafluoroisopropanol. Preferably methanesulfonic acid is used. If the reinforcing polymer phase comprises a lyotropic polymer, and the polymer matrix comprises a poly(ether ketoneketone) (PEKK) or a polyimide, sulfuric acid is preferably used.

These oriented, shaped composite articles, or "pre-forms", may then be consolidated into bulkier composite materials by applying heat and pressure to the article. The acidic solvent treatment facilitates this consolidation process. Consolidation techniques involve, for example, placing fibers in an appropriate mold and compressing the fibers while maintaining a temperature at or above the melting point, glass transition temperature, or reaction temperature of the thermally-consolidatable polymer. Composite materials such as composite plies including cross-plies, laminates of cross-plies, unidirectional composites, composites containing fabrics woven from fibers of the invention, and composites from discontinuous fibers can be made by such techniques. Alternatively, the "pre-forms" may be consolidated into bulkier composite materials prior to acidic solvent treatment.

The period for treating the composite material with the solvent is critical. If the period is too short, the polymer matrix will not dissolve sufficiently. However, if the period is too long, the polymer matrix and reinforcing phase, which dissolves more slowly than the polymer matrix, will completely dissolve. Generally, the period of treatment needed to dissolve the polymer matrix varies with the solubility of the polymer matrix in a particular solvent, the treatment technique, i.e, dipping, spraying, brushing etc., and the form of composite material, i.e., yarn, ply etc. The solvent may be applied by conventional techniques such as by, dipping, spraying, or brushing, provided there is sufficient contact time between the solvent and composite material. Generally, a sufficient contact time for treating a yarn is between 3 to 60 seconds, and a sufficient contact time for treating a ply is between 3 to 300 seconds.

The solvent is then removed from the composite material in such a manner that at least some of the polymer matrix is extracted from the material's interior and the matrix concentration increases at the material's surface. Since the process of extracting the matrix from the material's interior is by diffusion, the amount extracted, and the increase of matrix concentration at the surface is a function of the length of contact time. This extraction occurs in such a manner that a decreasing concentration gradient of polymer matrix forms from the material's surface to the material's interior This step of removing the solvent and extracting the matrix is preferably performed by such techniques as immersing the material in an appropriate basic solution and then rinsing the material with water until it is neutralized, or rinsing the material solely with water until neutralized. Alternatively, certain solvents may be removed by heating, or evaporating under ambient conditions. The solvent treatment and removal process of this invention may also be used to treat other polymer blends comprising a polymer matrix and reinforcing phase in order to extract at least some of the matrix from the material's interior and increase the matrix concentration at the material's surface. The increase of polymer matrix at the material's surface provides for improved surface properties such as adhesiveness, and the the concentration gradient of polymer matrix ensures that the matrix is distributed throughout the material. These properties make the material particularly useful for composite applications.

TESTING METHODS

Fiber X-ray Orientation Angle

A bundle of filaments, about 0.5 mm in diameter, is wrapped on a sample holder with care to keep the filaments essentially parallel The filaments in the sample holder are exposed to an X-ray beam produced by a Philips X-ray generator (Model 12045B) operated at 40 kv and 40 ma using a copper long fine-focus diffraction tube (Model PW2273/20) and a nickel beta-filter The diffraction pattern from the sample filaments is recorded on Kodak DEF Diagnostic Direct Exposure X-ray film (Catalogue Number 154-2463), in a Warhus pinhole camera. Collimators in the camera are 0.64 mm in diameter. The exposure is continued for about fifteen to thirty minutes, or generally long enough so that the diffraction feature to be measured is recorded at an Optical Density of ~1.0.

A digitized image of the diffraction pattern is recorded with a video camera. Transmitted intensities are calibrated using black and white references, and the gray level is converted into optical density. A data array equivalent to an azimuthal trace through the two selected equatorial peaks is created by interpolation from the digital image data file; the array is constructed so that one data point equals one-third of one degree in arc.

The Orientation Angle is taken to be the arc length in degrees at the half-maximum optical density (angle subtending points of 50 percent of maximum density) of the equatorial peaks, corrected for background. This is computed from the number of data points between the half-height points on each side of the peak. Both peaks are measured and the Orientation Angle is taken as the average of the two measurements.

Inherent Viscosity

Inherent Viscosity (IV) is defined by the equation:

$$IV = \frac{\ln(\eta_{rel})}{c}$$

where c is the concentration (0.5 gram of polymer in 100 ml of solvent) of the polymer solution and $\eta_{rel}$ (relative viscosity) is the ratio between the flow times of the polymer solution and the solvent as measured at 30° C. in a capillary viscometer.

Intrinsic Viscosity

Intrinsic viscosity [n] is defined by the equation:

$$[n] = [IV]_{c=o}$$

where [IV] is the inherent viscosity and c=o is zero concentration. The intrinsic viscosity for PBT and PBO are measured in methanesulfonic acid at 30° C.

Domain Size in Spin Dopes

Spin dopes are examined with optical microscopy to determine the biphasic nature of these solutions. For poly(paraphenylene terephthalamide), polyamide, sulfuric acid dopes, samples are prepared by scraping a thin layer of solidified dope at room temperature. This thin layer is placed between two glass slides. The slides are set into a Mettler FP82 hot stage which is held at about 90° C. When the dope melts, the slides are pushed firmly together using hand pressure. This results in a thin, translucent layer of solution. The sample is then allowed to relax for about 1-1.5 hours. For a cellulose triacetate, PAN, nitric acid solution, the dope is placed between two glass slides. The sample is pressed, using hand pressure, to facilitate a thin sample. The edges of the slides are sealed with Parafilm to prevent loss of solvent. The sample is then allowed to relax overnight at room temperature.

The samples are observed with polarized and cross-polarized light using a Nikon polarizing optical microscope equipped with a camera. It has been shown that when static (relaxed) isotropic solutions are placed between crossed polarizing elements, they will essentially not transmit any light. However, anisotropic dopes will transmit light and a relatively bright field is observed. Since these solutions are composed of two phases, one being isotropic and one being anisotropic, the two phases can be distinguished by comparison of observation between polarized and cross polarized light. The samples may be viewed and photographed at 100x using Polaroid type 57 3000 ASA film. The size of the isotropic and anisotropic domains are determined by measurement of the domains on the photographs.

Composite Testing

The composite samples were tested for lap-shear strengths in an Instron testing frame as described in Examples 2 and 9, infra.

Electron Spectroscopy for Chemical Analysis (ESCA)

A Perkin-Elmer PHI 5400 ESCA Spectrometer was used to determine the surface composition and surface chemical functionality of the samples.

A survey spectrum was obtained after the sample was introduced into the spectrometer's vacuum chamber. From the peaks in the spectrum, the elements detected on the surface of the sample were identified. Then, high resolution spectra were obtained for the elements directed in the survey spectrum.

From the high resolution spectra, the binding energy of a given element can be obtained and after correction for charging it, the binding energy can be used to provide information on the functional group or oxidation state of the element.

The atomic concentration (AC) of an element is the ratio of that element to the sum of the other elements present (excluding hydrogen) in the acquired data. Elemental atomic concentrations are expressed as percentages and are based on the area under the peak in the spectrum. The area under the peak is calculated from the absolute area under the peak by subtracting the background and normalizing the area for the step size (set experimentally). The formula for calculating the atomic concentration percentage is given by the following equation:

$$AC \text{ for element } x = [(I_x/S_xT_x)/Sum(I_i/S_iT_i)]100$$

where:
- I = peak area corrected for background and normalized for step size
- S = peak area sensitivity factor (element and electron energy level specific)
- T = total acquisition time per data point

Infrared Spectroscopy

A portion of a sample composite ply with an area of 10 to 25 square micrometers was physically removed from the sample's surface and placed on an infrared transparent KBr salt crystal. Infrared transmissions spectra were obtained using a Perkin-Elmer 1800 FTIR spectrometer and a Spectra Tech IR Plan II Microscope accessory. The scanning criteria were as follows: scan range: 4000 to 700 cm$^{-1}$, resolution: 4 cm$^{-1}$, apodization: medium, number of scans: 32, sample and background: KBr, detector - liquid nitrogen cooled mercury/cadmium/telluride (MCT).

EXAMPLES

Example 1

This Example illustrates the preparation of appropriate microcomposite unidirectional tape plies which may be subsequently treated with an acidic solvent. A microcomposite yarn of 64% by weight of poly(paraphenylene benzobisthiazole) (PBT) and 36% poly(ether ketoneketone) (PEKK) was produced in the following manner.

In a 3.8 liter mixing vessel, 205 cc of 100% sulfuric acid, 245 cc of poly(phosphoric acid), and 101 cc (135.6 g) of PEKK polymer were stirred overnight at 32° C. under a nitrogen atmosphere. The mixing vessel was then warmed to 50° C. and 1588 g of a solution having 15% of PBT in poly(phosphoric acid) was added. This mixture was then stirred at 50° C. for 1.5 hours. After this time, 939 cc of poly(phosphoric acid) was added to the mixing vessel. This mixture was then stirred overnight at 56° C.

A vacuum (1 mm Hg pressure) was then applied to the mixing vessel for 3 hours, while the mixture continued to be stirred. After this time, the temperature was increased to 80° C. and the stirrer was turned off. After sitting for 1 hour, the dump valve at the mixing vessel's bottom was opened and the vessel was pressurized with nitrogen to force the solution out. The solution was pumped by a gear pump at a rate of 2.7 cc/min through an X7 Dynalloy filter and then through an 80 hole spinneret with each hole having a diameter of 0.007 inches. The extruded filaments passed through a 1 cm air gap and into a circulating water bath. The temperature of the bath was maintained at 5° C. Coagulated yarn was pulled from the bath and wound up continuously on bobbins at a speed of 11 meters/minute.

The as-spun microcomposite yarn was then soaked in 5 gallon buckets of water for three days to remove the solvent. The yarn was then heat-treated at a temperature of 375° C. in a 15 foot tube oven purged with nitrogen. A tension of 1.3 grams per denier (gpd) was applied to the yarn during heat-treatment, and a residence time of 18 seconds in the oven was used. The yarn which exited the oven was wound up on cardboard bobbins.

The microcomposite yarn was then converted into unidirectional tape plies using the following process:

A 16"×11"×0.25" composite card, i.e., a flat plate, was covered on both sides with a polyimide film. The card was then mounted in a winding device with a rotor, to which the card was mounted, and an independently controlled traverse. Heat treated yarn was threaded through an automatic tensioning device, through the traverse of the winder and the end of the yarn was taped to an edge of the card. The yarn was then wrapped around the card with the rotor and traverse speeds controlled so as to make 70 to 80 wraps per inch on the card and to keep the yarn bundles parallel to the long axis of the card. Four passes were made. covering a width of 10.25" with a total of 300 wraps of yarn per inch. After winding, the yarn was cut and the cut end taped down to an edge of the card. On each side of the card, the yarn was then covered with a piece of polyimide film and a 12"×17"×1/16" ferro type plate. This lay-up was then wrapped in a double layer of aluminum foil and the edges rolled tight to make an effective seal. The package was placed in a hydraulic press and a small (1/16" diameter) tube was inserted in the foil. A nitrogen flow was maintained through this tube to purge the package of air. The hydraulic press platens were then closed to a point where the card was placed under slight positive pressure (approximately 10 psi) and then heated to a temperature of 335° C. When the platens reached a temperature of 335° C., a pressure of 150 psi was applied and maintained for ten minutes. At the end of ten minutes, the pressure was reduced to 10 psi and the heat to the platens was turned off. The press was then allowed to cool to room temperature overnight.

After the card had cooled to room temperature, it was removed from the press and the foil wrapping and ferro plates were removed. The pressed yarn was removed from the card by cutting the yarn at the card edges using a razor knife and carefully peeling the inner polyimide film layer away from the card with a spatula. The polyimide film was then carefully removed from the consolidated microcomposite fibers by slowly peeling off the film in a direction perpendicular to the direction of the fiber. This process yielded coherent 10.25"×16"×0.018" sheets of PBT/PEKK microcomposite tape with the fibers uniaxially aligned along the long axis of the sheet.

Example 2

Using a razor blade, ten 3.5"×0.5" strips were cut from the PBT/PEKK microcomposite tape prepared in Example 1. These strips were cut in such a manner that the fiber direction was parallel to the long (3.5") axis of the strips and are referred to as "0 degree strips". Additionally, two 3.5"×1.25" strips were cut with the fiber direction parallel to the long axis of the strip.

All of the 3.5"×0.5" strips were placed in 100.05% sulfuric acid such that 1.75", or one-half the length, of each strip was immersed. Six strips were immersed for 10 seconds, and four were immersed for 20 seconds. At the end of the acid immersion time, all of the strips were removed and completely immersed in cold water in which they were rinsed until neutralized.

Both 3.5"×1.25" strips were similarly placed in 100.05% sulfuric acid such that a 2.0" section, or two thirds of the length, was immersed. One strip was immersed for 20 seconds and the other for 60 seconds. At the end of the acid immersion time, both strips were removed and washed with water until they were neutralized.

Figure 2:
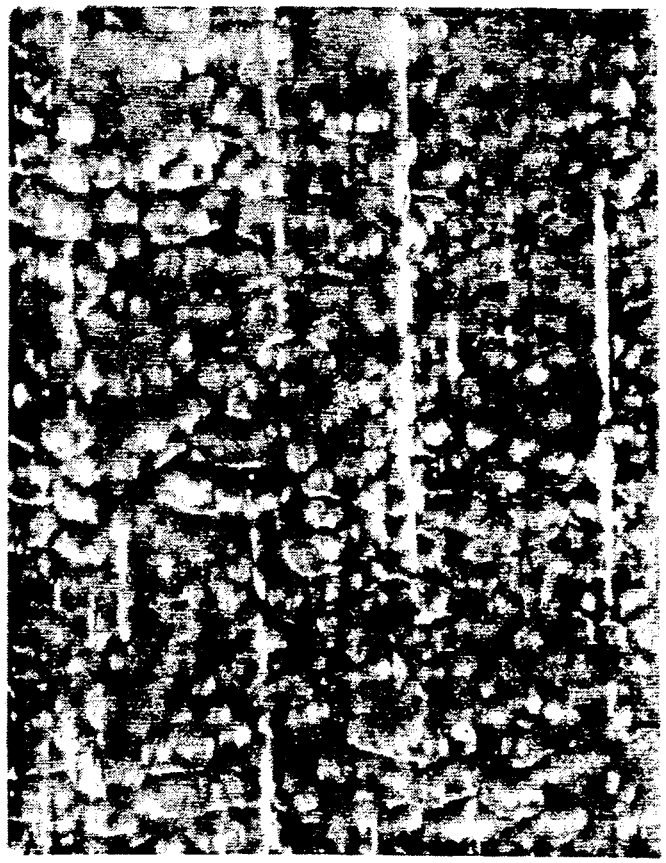
FIG. 2 is a optical micrograph (OM) at 50 ×of a longitudinal section of the microcomposite ply of FIG. 1 which has been treated with an acidic solvent according to the present invention.

Those regions of the 3.5"×0.5" and 3.5"×1.25" ply strips which were not in contact with the acidic solvent did not change colors, and had a rough surface with bare fibers exposed. FIG. 1 shows such a region of a 3.5"×1.25" strip. In contrast, each region of the 3.5"×0.5" and 3.5"×1.25" strips which were in contact with the acidic solvent underwent a color change from an original reddish-brown to a golden color, and had a smooth surface indicating that the polymer matrix had been deposited on the ply's surface. FIG. 2 shows a region of the ply strip of FIG. 1 which was in contact with the acidic solvent. The surface compositions of the treated and untreated regions of the PBT/PEKK microcomposite plies were determined by ESCA analysis and are presented in Table 1. The elements, sulfur and nitrogen are unique to PBT. However, some sulfur may be present in the PEKK which is either due to sulfonation or residual solvent. Therefore, the atomic percentage of nitrogen issued as an indicator of the PBT content. If more nitrogen is detected at the surface, it signifies that more PBT is present at the surface. For each treated and analyzed region, the nitrogen content is significantly reduced versus that of the untreated region. In two of the samples, there was no detection of any nitrogen on the treated surfaces.

TABLE 1

| Acid Treatment | Atomic Concentration (%) | | | |
|---|---|---|---|---|
| (seconds) | C | O | N | S |
| 10 | 80 | 18 | 0 | 1.4 |
| 20 | 77 | 18 | 1.1 | 2.8 |
| 60 | 75 | 20 | 0 | 2.7 |
| Untreated | 79 | 15 | 2.3 | 2.4 |

Several 1.0"×0.5" strips were cut from the treated regions of the 3.5"×1.25" ply strips. These 1.0"×0.5 strips were cut with a fiber direction oriented perpendicular to the long (1") axis of the strips and are referred to as "90 degree strips".

Using the treated regions of the 3.5"×0.5" ply strips, lap-shear test samples were prepared in the following manner:

A 6"×0.5" strip of polyimide film which had been sprayed on both sides with "Frekote" 44 mold release agent was placed on the bottom of a 6"×0.5" rectangular matched die mold. A first, 3.5"×0.5", 0-degree, strip was placed on top of the polyimide film with the untreated end of the strip placed against the end of the mold, and the treated end placed over the center of the mold. A 1.0×0.5", 90-degree strip, was then placed on top of the treated end of the 0-degree strip so that it covered the last 1 inch of the 0-degree strip. A second, 3.5"×0.5", 0 degree, strip was placed on top of the 90-degree strip and the first 0-degree strip with the untreated end of the strip against the end of the mold opposite the untreated end of the first 0-degree strip and the treated end of the strip covering the 90-degree strip. This lay-up yielded a 6 inch long sample with the center 1 inch of the sample consisting of a three-ply overlap of a 90-degree ply sandwiched between two 0-degree plies and is referred to as a 0/90/0 degree lay-up.

These samples were treated with acidic solvent for various time periods as shown in Table 2.

TABLE 2

| | Acid Treatment (seconds) | | Lap-Shear Strength |
|---|---|---|---|
| Sample | 0-Degree Plies | 90 Degree Ply | (PSI) |
| 1 | 10 | 10 | 285 |
| 2 | 20 | 10 | 243 |
| 3 | 10 | 20 | 156 |
| 4 | 20 | 20 | 410 |
| 5 | 10 | 60 | 560 |
| 6 | 0/20 | 60 | 40 |
| 7 | 0 | 0 | 0 |

A second "Frekote" 44 sprayed 6"×0.5" polyimide film was placed on top of the 0/90/0 degree layup and the top ram plate of the mold was inserted. A thermocouple was placed in the mold wall and the assembly was wrapped in aluminum foil and placed in a hydraulic press.

As the five samples were purged with nitrogen through a tube which was inserted in the aluminum foil, the press platens were closed to apply a small positive pressure (approximately 10 psi) to the mold and were heated to 375° C. When the platens reached 375° C., the pressure was increased to 2000 psi and maintained for ten minutes. After ten minutes, the platen heaters were turned off and the platens were water cooled to reduce the temperature at a rate of approximately 10° C. per minute. Pressure was maintained until the temperature was below 140° C., at which point the pressure was allowed to slowly drop off as the mold cooled. The mold was removed from the press after it had cooled to below 40° C.

The samples were removed from the mold and the polyimide film was peeled off. The overlap areas of all five samples appeared well bonded. Each sample was prepared for testing by bonding two 1/16"×1"×½" cardboard tabs on each end of the sample with an epoxy adhesive. The samples were tested in tension in an Instron Model No. 1122 testing frame with an Instron 1000 pound reversible load cell. All of the samples were tested with a 4.0" gage length. Samples 1, 2, and 3 were tested with an elongation rate of 0.005 inches/minute. The elongation rate was increased to 0.02 inches/minute for samples 4 and 5 in order to overcome the observed tab slipping which occurred at low strain rates. The lap shear strengths were determined by dividing the ultimate load (in pounds force) at which the bond failed by the bond area, which was 0.5 square inches in all cases. Measured lap shear strengths ranged from a lowest value of 156 psi to a highest value of 558 psi, as listed in Table 2. The failed test samples showed evidence of plastic deformation and pull-out of matrix at the failed interface which are indications that the two surfaces were well bonded together.

Example 3

A PBT/PEKK microcomposite, 0/90/0 degree, lap shear sample was prepared using the same procedures as described in Example 2, except that one of the 0-degree plies used was not treated with the acid solvent. The other 0-degree ply was treated for 20 seconds in sulfuric acid and the 90-degree ply was soaked in sulfuric acid for 60 seconds.

The sample was prepared, molded and tabbed under the same conditions described for the samples in Example 2. The sample was tested in tension using the same conditions described for the samples of Example 2 and is listed as Sample 6 in Table 2. The sample failed at a bond strength of only 40 psi and failed on the interface between the 90-degree ply and the untreated 0-degree ply. Microscopic examination of the failed interface showed no evidence of plastic deformation or adhesive bonding.

Example 4

PBT/PEKK microcomposite, 0/90/0 degree, lap shear samples were prepared using the same procedures as described in Example 2, except that none of the plies in the samples were treated with acid. The samples were molded under a number of conditions, including those described for the samples in Example 2, with pressures ranging from 1000 to 6000 psi and temperatures ranging from 350° to 450° C. In each case, the adhesion was so poor that the samples either did not bond and fell apart when removed from the mold, or were so loosely bonded that they could not be handled and tabbed for mechanical testing as shown by Sample 7 in Table 2.

Example 5

A microcomposite yarn of 69% by weight of PBT and 31% of a thermoplastic polyamide was prepared according to the following procedure. The thermoplastic polyamide was an amorphous copolymer of hexamethylene diamine, isophthalic and terephthalic acids in a 100/70/30 mol percent basis.

1,157 grams of methanesulfonic acid (MSA) and 39 grams of poly(phosphoric acid) (PPA) were mixed in a beaker and poured into a 3.8 liter mixer. Mixing was continued inside the mixing vessel at 30 rpm under a nitrogen atmosphere. 88.7 grams of the dried polyamide were added and mixed overnight to assure complete dissolution. The temperature of the solution was measured during the next morning and found to be 50° C. This rise in temperature from room temperature to 50° C. was due mainly to the mechanical action from the mixing. 1,315 grams of a 15% by weight PBT/ 85% PPA dope were added to the solution and mixed for seven days. The resulting highly viscous dope was transferred to a spin cell, attached to the bottom opening of the mixer. This viscous dope was deaerated by extruding from the first cell, through a thin slot, and into the vacuum chamber of a second cell at 50° C. Microcomposite yarns were air-gap spun at 60° C., at a rate of 9 meters/minute using a 80-hole spinneret having 4-mil diameter holes into an ice bath.

Figure 3:
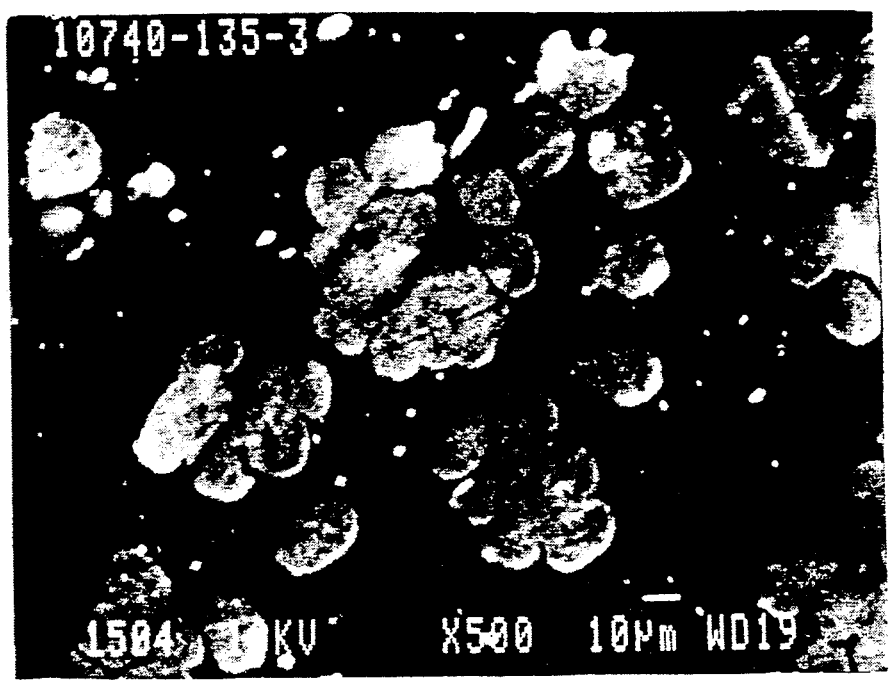
FIG. 3 is a scanning electron micrograph (SEM) at 500 ×of a cross-section of a poly(paraphenylene benzobisthiazole)(PBT)/polyamide microcomposite yarn which has not been treated with an acidic solvent.
Figure 4:
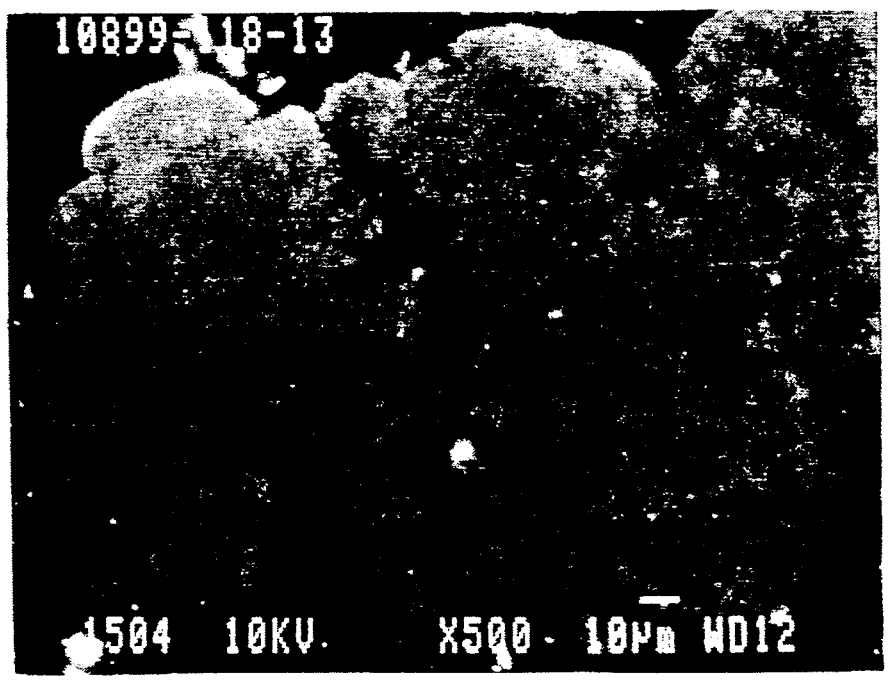
FIG. 4 is a scanning electron micrograph (SEM) at 500 × of a cross-section of the microcomposite yarn of FIG. 3 which has been treated with an acidic solvent according to the present invention.

The heat-treated, feed yarn (290 filaments, 500 denier) was wound off a feed bobbin, fed through a tension gate and into an 100.05% sulfuric acid solvent bath. After leaving the acid bath, the yarn passed through a water coagulation bath and then into an aqueous ammonium hydroxide neutralization bath. The treated yarn was then wound up on a bobbin which was kept wet with a water spray to further effect solvent removal. The solvent contact time was controlled by varying the acid contact length and the throughput rate. The acid contact length is defined as the length of the threadline from the point of entry into the acid bath to the point of entry into the coagulation bath and the throughput rate is defined as the velocity of the threadline. The yarn was treated with a solvent contact time of 8.8 seconds (1.83 feet acid contact length, 12.5 feet/min throughput rate). After this treatment, the yarn was background through a tube furnace at 200° C. in order to retry the yarn. The untreated, feed yarn could easily be separated into individual filaments and were not highly fused together, as shown in FIG. 3. However, after solvent treatment and removal the same yarn had the appearance of a thin (approximately 1/16" wide) tape and the filaments of the yarn were highly fused together by a coating of polymer matrix, as shown in FIG. 4. Furthermore, only a small amount of material was lost, as evidenced by a less than two percent (<2%) reduction in denier of the treated yarn versus the untreated yarn.

This treated PBT/polyamide microcomposite yarn was wrapped around an aluminum card and pressed to make a unidirectional tape according to the process described in Example 1. This tape was then cut and used to produce three 0/90/0 degree lap shear test samples according to the process described in Example 2. The samples were compression molded at a temperature of 335° C. and a pressure of 1500 psi. These samples had an average lap shear strength of 423 psi.

Example 6

Some untreated PBT/polyamide microcomposite yarn of Example 5 was used to form 0/90/0 degree lap shear samples according to the processes described in Examples 1 and 2. The samples were compression molded under the same conditions described in Example 5 (325° C./1500 psi). These untreated samples had an average lap shear strength of 250 psi.

Example 7

A microcomposite yarn of 63% by weight of PBT and 37% polyimide was prepared according to the following process:

A quaternary spin dope containing PBT and the polyamic acid having the repeat unit,

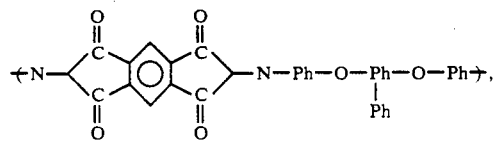

was first prepared. This spin dope was prepared as follows:

9.43 grams of polyamic acid and 82.9 grams of methanesulfonic acid were loaded into an Atlantic mixer and stirred overnight at room temperature under an inert atmosphere to form a solution. 113.0 grams of a 15% by weight PBT/85% poly(phosphoric acid) (PPA) dope were added to the solution. The mixture was then stirred overnight at 53° C., and then at 62° C. for 2.5 hours. The spin dope was then transferred to a first spin cell. To effect deaeration, the dope was transferred to a second spin cell by extrusion under vacuum through a slit die. The dope was then spun through a 10-hole spinneret with each hole having a 0.007 inch diameter at 2.1 meters/minute. The dope passed through a 1.3 cm air-gap at 75° C. and into a room temperature water bath. The yarn was wound up onto a bobbin with a spin stretch factor of 4.9. The bobbin was soaked in water for one day to completely extract residual spin solvent and then air-dried. Analysis of the yarn indicated that greater than 90 percent of the polyamic acid had been converted to polyimide.

The as-spun yarn was wound around an aluminum card which had been covered with a polyimide film to form a unidirectional sheet according to the process described in Example 1. This sheet was then pressed at 355° C., 200 psi under nitrogen to consolidate it into a tape. The tape was then cut into 6"×0.5" strips. Four strips were solvent treated by painting, i.e., brushing, the surface with 100.05% sulfuric acid, allowing the acid to stand for 10 seconds, and then rinsing thoroughly with water. These strips were then used to produce two uniaxial two-ply lap shear test samples according to the process described in Example 2. The samples were compression molded at a temperature of 425° C. and a pressure of 2000 psi under nitrogen.

The samples had an average lap shear strength of 180.5 psi. The failed specimens exhibited a significant amount of fiber pull-out across the interface, indicating that the two surfaces were well bonded together.

Example 8

Some untreated PBT/polyimide yarn of Example 7 was used to prepare uniaxial lap shear test samples according to the processes described in Examples 1 and 2. The samples were compression molded under the same conditions described in Example 7 (425° C./2000 psi under nitrogen). These untreated samples had an average lap shear strength of 118 psi and failed cleanly, with no evidence of plastic deformation or adhesive failure.

Example 9

Sheets of microcomposite plies were made by winding microcomposite fiber of 69% by weight of PBT and 31% of an amorphous thermoplastic polyamide on a 6.5" by 6.5" aluminum plate in the same direction. The thermoplastic polyamide was an amorphous copolymer of hexamethylene diamine, isophthalic and terephthalic acids in a 100/70/30 mol percent basis. The 69% PBT/ 31% polyamide microcomposite fiber was made according to the following procedures.

1,157 grams of methanesulfonic acid (MSA) and 39 grams of poly(phosphoric acid) (PPA) were mixed in a beaker and poured into a 3.8 liter mixer. Mixing was continued inside the mixing vessel at 30 rpm under a nitrogen atmosphere. 88.7 grams of the dried polyamide were added and mixed overnight to assure complete dissolution. The temperature of the solution was measured during the next morning and found to be 50° C. This rise in temperature from room temperature to 50° C. was due mainly to the mechanical action from the mixing. 1,315 grams of a 15% by weight PBT/ 85% PPA dope were added to the solution and mixed for seven days. The resulting highly viscous dope was transferred to a spin cell, attached to the bottom opening of the mixer. This viscous dope was deaerated by extruding from the first cell, through a thin slot, and into the vacuum chamber of a second cell at 50° C. Microcomposite yarns were air-gap spun at 60° C., at a rate of 9 meters/minute using a 80-hole spinneret having 4-mil diameter holes into an ice bath.

A layer of polyimide film ,"Kapton", available from E.I. du Pont de Nemours and Co., Inc. was placed on the aluminum plate before and after the yarns were wound. The aluminum plate was placed in a vacuum press and the wound fibers were consolidated at a temperature of 300° C. and a pressure of 293 psi into a sheet product. Ply strips measuring 0.5" (width) by 6.0" (length) were cut from the consolidated sheets at 90 degrees and also at 0 degrees to the direction of the fiber. The following sequence of steps were used to extract the thermoplastic matrix from the ply strips:

Two strips of the 0 degree plies were dipped half way into 100% concentrated methanesulfonic acid (MSA) solvent. The untreated halves became the control samples. Excess MSA was applied using an eye dropper on the treated halves of the strips and the strips were held horizontal for 3–4 minutes. Afterwards, the strips were placed in a beaker of distilled water to remove the MSA solvent. The MSA solvent was further removed by immersing the strips in another beaker of fresh distilled water for two days. Afterwards, the strips were immersed in distilled water having a pH adjusted to 10.5 by using ammonium hydroxide. This was followed by rinsing the strips in distilled water again and letting the strips air dry.

A three layer composite ply strip was prepared by sandwiching an untreated 90 degree strip between the two solvent treated 0 degree strips and placing the layer of strips in a 0.5"×6.0" mold. A layer of "Kapton" film was placed on top and below the layer of strips. Consolidation was done in a vacuum at 300° C. with pressure up to 747 psi. The final consolidated 0/90/0 degree, 0.5"×6.0", composite ply strip was cut at the center to separate the control from the solvent treated regions. A 0.5"×3.0" lap-shear specimen was prepared for each control and solvent treated sample by removing certain areas of the plies such that a 0.5"×0.25" 90 degree strip covered one end of a bottom 0.5"×1.625" 0 degree strip, and a second, 0.5"×1.625" 0 degree strip covered the top of the 0.5"×0.25" 90 degree strip. The lap-shear strength of the 0.5"×0.25" overlapping area was measured by clamping the aluminum tabbed ends of the specimen in an Instron tensile tester (Model 1122). The lap-shear strength of the control sample was 230 psi, while the solvent treated sample had a lap-shear strength of 318 psi.

Example 10

Four, 0.5"×3.0", 0 degree strips and two, 0.5"×3.0" 90 degree ply strips were cut from the microcomposite sheet of Example 9. The strips were treated with solvent in the same manner as described in Example 9, except that the solvent used was 89.7% concentrated MSA, and the strips were completely treated with solvent. The control strips were made separately from the same microcomposite sheets as the solvent treated strips. At this concentration, the solvent will selectively dissolve the polyamide polymer matrix but will not dissolve the PBT.

The strips were rinsed free of the acid solvent and air dried as described in Example 9. Additionally, the strips were vacuum oven dried at 97° C. for 3 days. A white coating was observed to cover the surface of the solvent-treated strips, whereas the control strips remained dark brown. A sample of this white coating was scraped and analyzed by infrared spectroscopy (IR), and found to have identical spectra as that of the pure polyamide matrix. Two, 0/90/0 degree, lap-shear specimens were prepared and tested in the same manner as described in Example 9. The lap-shear strengths of the solvent treated samples were 476 psi and 774 psi. The average lap-shear strength for the control samples was 319 psi.

Example 11

Sheets of microcomposite plies were made by winding microcomposite fiber of 70% by weight of poly(p-phenylene terephthalamide) and 30% of an amorphous thermoplastic polyamide, in the same manner as described in Example 9. The thermoplastic polyamide was an amorphous copolymer of hexamethylene diamine, (20tt) bis(p-amino-cyclohexyl)methane, isophthalic, and terephthalic acids in a 96/4/70/30 mol percent basis. The strips were treated with solvent in the same manner as described in Example 9, except that the solvent used was 89.7% concentrated MSA, and the solvent contact time for the samples varied as shown in Table 3. The lap-shear samples were made and tested in the same manner as described in Example 9. The lap-shear strengths for the control and solvent treated samples are shown in Table 3.

TABLE 3

| Acid Treatment Sample | Acid Treatment (Minutes) | Lap-Shear Strength | Control Sample | Lap-Shear Strength |
|---|---|---|---|---|
| 1 | 1 | 840 psi | 1 | 300 psi |
| 2 | 3 | 840 psi | 2 | 364 psi |
| 3 | 6 | 744 psi | 3 | 337 psi |

We claim:

1. An oriented, shaped microcomposite article, comprising at least about 30% and less than about 80% by weight of a reinforcing polymer phase consisting essentially of at least one lyotropic polymer, and at least about 20% and less than about 70% by weight of a polymer matrix consisting essentially of at least one thermally-consolidatable polymer, said reinforcing polymer phase being continuous in the direction of orientation while interpenetrating said polymer matrix throughout the article, said article having a decreasing concentration gradient of polymer matrix from the article's surface to the article's interior.

2. An oriented, shaped micro composite article of claim 1, wherein said lyotropic polymer is a para-aramid.

3. An oriented, shaped composite article of claim 1, wherein said lyotropic polymer is an aromatic-heterocyclic polymer.

4. An oriented, shaped micro composite article of claim 1, wherein said thermally-consolidatable polymer is selected from the class consisting of thermoplastic polyamides.

5. An oriented, shaped micro composite article of claim 1, wherein said lyotropic polymer is a para-aramid, and said thermally-consolidatable polymer is selected from the class consisting of thermoplastic polymers.

6. An oriented, shaped micro composite article of claim 1, wherein said lyotropic polymer is a para-aramid, and said thermally-consolidatable polymer is selected from the class consisting of thermoplastic polyamides.

7. An oriented, shaped micro composite article of claim 1, wherein said lyotropic polymer is an aromatic-heterocyclic polymer, and said thermally-consolidatable polymer is selected from the class consisting of thermoplastic polymers.

8. An oriented, shaped micro composite article of claim 1, wherein said lyotropic polymer is an aromatic-heterocyclic polymer, and said thermally-consolidatable polymer is selected from the class consisting of thermoplastic polyamides.

9. An oriented, shaped micro composite article of claim 1, wherein said thermally-consolidatable polymer is a polyimide.

10. An oriented, shaped micro composite article of claim 1, wherein the article is in the form of a fiber.

11. An oriented, shaped micro composite article of claim 1, wherein the reinforcing polymer phase and polymer matrix are co-continuous.

12. An oriented, shaped micro composite article of claim 1, wherein said thermally-consolidatable polymer is selected from the class consisting of thermoplastic polymers.

13. An oriented, shaped micro composite article of claim 12, wherein said thermoplastic polymer is poly(ether ketoneketone).

14. A micro composite ply, comprising at least about 30% and less than about 80% by weight of a reinforcing polymer phase consisting essentially of at least one lyotropic polymer, and at least about 20% and less than about 70% by weight of a polymer matrix consisting essentially of at least one thermally-consolidatable polymer, said reinforcing polymer phase being continuous in the direction of orientation while interpenetrating said polymer matrix throughout the ply, said ply having a decreasing concentration gradient of polymer matrix from the ply's surface to the ply's interior.

15. A micro composite ply of claim 14, wherein said lyotropic polymer is a para-aramid.

16. A micro composite ply of claim 14, wherein said lyotropic polymer is an aromatic-heterocyclic polymer.

17. A micro composite ply of claim 14, wherein said thermally-consolidatable polymer is selected from the class consisting of thermoplastic polyamides.

18. A micro composite ply of claim 14, wherein said lyotropic polymer is a para-aramid, and said thermally-consolidatable polymer is selected from the class consisting of thermoplastic polymers.

19. A micro composite ply of claim 14, wherein said lyotropic polymer is a para-aramid, and said thermally-consolidatable polymer is selected from the class consisting of thermoplastic polyamides.

20. A micro composite ply of claim 14, wherein said lyotropic polymer is an aromatic-heterocyclic polymer, and said thermally-consolidatable polymer is selected from the class consisting of thermoplastic polymers.

21. A micro composite ply of claim 14, wherein said lyotropic polymer is an aromatic-heterocyclic polymer, and said thermally-consolidatable polymer is selected from the class consisting of thermoplastic polyamides.

22. A micro composite ply of claim 14, wherein aid thermally-consolidatable polymer is a polyimide.

23. A micro composite ply of claim 14, wherein the reinforcing polymer phase and polymer matrix are co-continuous.

24. A laminate, comprising the micro composite ply of claim 14.

25. A micro composite ply of claim 14, wherein said thermally-consolidatable polymer is selected from the class consisting of thermoplastic polymers.

26. A micro composite ply of claim 25, wherein said thermoplastic polymer is poly(ether ketoneketone).

* * * * *